F. P. MANSBENDEL.
MOTOR DEVICE.
APPLICATION FILED JULY 9, 1917.

1,321,533.

Patented Nov. 11, 1919.

INVENTOR
Fritz P. Mansbendel
By Fredk R. Schuck
ATTORNEY

UNITED STATES PATENT OFFICE.

FRITZ P. MANSBENDEL, OF BROOKLYN, NEW YORK, ASSIGNOR TO VIBROMOTOR SPECIALTIES CO., INC., OF NEW YORK, N. Y., A CORPORATION OF NEW YORK.

MOTOR DEVICE.

1,321,533.  Specification of Letters Patent.  Patented Nov. 11, 1919.

Application filed July 9, 1917. Serial No. 179,450.

*To all whom it may concern:*

Be it known that I, FRITZ P. MANSBENDEL, a former citizen of the German Empire, and who have declared my intention of becoming a citizen of the United States, and a resident of Brooklyn, in the county of Kings and State of New York, have invented certain new and useful Improvements in Motor Devices, of which the following is a specification.

The invention relates to mechanism for effecting an oscillating movement, and more particularly to a device operating through the action on an armature or similar member under the influence of an electromagnet. Various devices of this character are known, but, as a rule, the period of vibration is too short, that is to say, the rate of vibration is too high for ordinary purposes.

The invention has for its object to reduce, in an electrically operated device of the character set forth, the frequency of vibration within limits suitable for the commercial application of the apparatus. For example, the device may be used in connection with signal devices, advertising apparatus and the like, although it is to be understood that the invention is not restricted to this particular field. A further object of the invention is to produce a simple and positively acting device, and to provide means in connection therewith whereby the period of vibration may be readily adjusted.

The nature of the invention will be best understood when described in connection with the accompanying drawings, in which—

Similar characters of reference designate corresponding parts throughout the several views.

Figure 1:
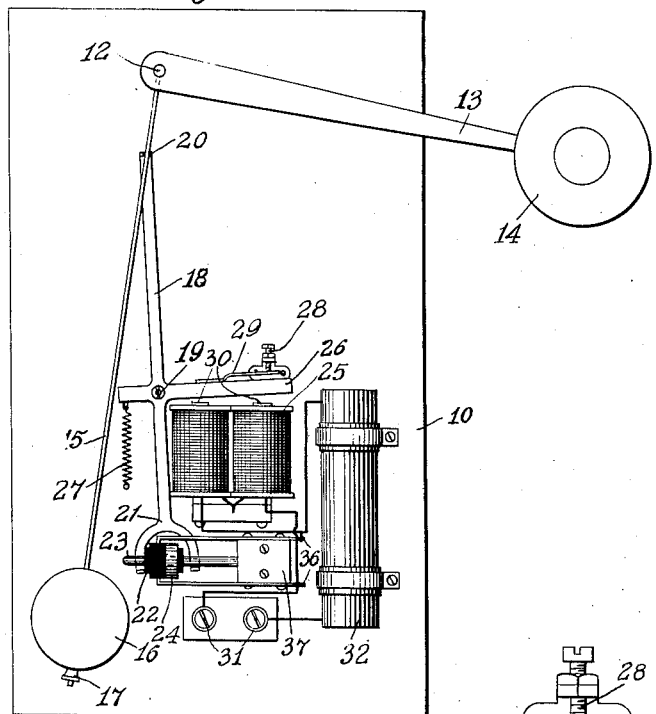
Figure 1 is a front elevation of the device with cover removed.
Figure 2:
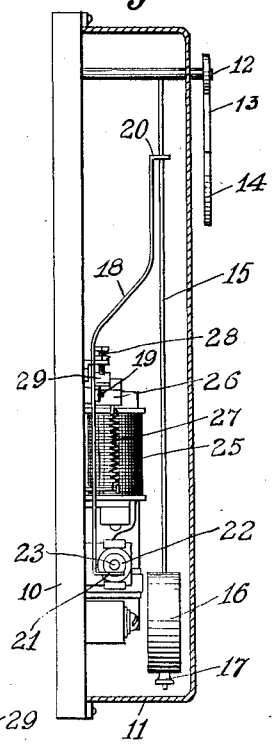
Fig. 2 is a vertical section through the casing.

Referring to the drawings, 10 designates a suitable base plate upon which the apparatus may be mounted, and there is usually provided in connection therewith a suitable covering or casing 11 to protect the apparatus, and through which projects a rock-shaft 12 mounted to rock in the base and casing. The shaft 12 extends outside of the said casing 11 for connection to a mechanism or devices which it is desired to operate or control, for example, an arm 13 carrying a signal disk 14. The rock-shaft has depending therefrom and securely attached thereto a pendulum rod 15 carrying a bob 16 at the lower end, which may be made adjustable thereon as by means of a nut 17 working on the threaded end of said rod 15. To impart oscillatory movement to the pendulum rod 15, and thereby through shaft 12 to the arm 13, a forked rod 18 is pivotally secured to the base 10 as at 19, its upper end being turned at right angles to its length and provided with a slot 20 into which fits the rod 15. Therefore, when said rod 18 is oscillated about pivot 19 as a fulcrum, in manner hereinafter set forth, corresponding oscillation will be communicated to the pendulum rod 15, and the period of vibration thereof may be adjusted through the pendulum bob 16 aforesaid.

The lower end of rod 18 is provided with a fork 21 whose tines surround a contact drum or commutating device 22 of insulating material and movable on a rod 23, said drum carrying a contact collar or ring 24. The drum 22 is surrounded by, and is adapted to be engaged by, the tines of said fork under the oscillation of said rod 18, a predetermined space being left between the ends of said drum and the said tines.

This oscillation is conveniently effected through the action of a pair of electromagnets 25 attracting an armature 26 secured to the rod 18 and normally held away from same by a retractile spring 27. An adjustable stop 28 is secured to the casing and bears upon a spring member or buffer 29 attached to the armature 26, whereby the position of said armature relatively to the pole pieces 30 of the electromagnet may be determined.

Current to actuate the said electromagnet is introduced at the terminals 31, passing through a resistance 32 to the electromagnets 25. The contact member 22, hereinbefore referred to, is designed at certain periods to short-circuit the said electromagnets 25 and thereby permit of armature 26 being freed from the pole pieces 30 under the action of the retractile spring 27, together with the action of the pendulum in returning from the opposite position. To this end, the said contact member 22 is slidably mounted upon a rod 23, as aforesaid, extending substantially at right angles to the rod 18; and is located between the tines of the said fork 21 with a predetermined amount of play or lost motion between same. Diametrically-opposed contact springs or brushes 36 are secured to a block of insulation 37 and are adapted to bear at their outer ends on the said collar 24 of the contact drum 22 when the oscillatable member or rod 18 reaches its extreme outward positions, and thereby short-circuit the electromagnets 25.

Figure 3:
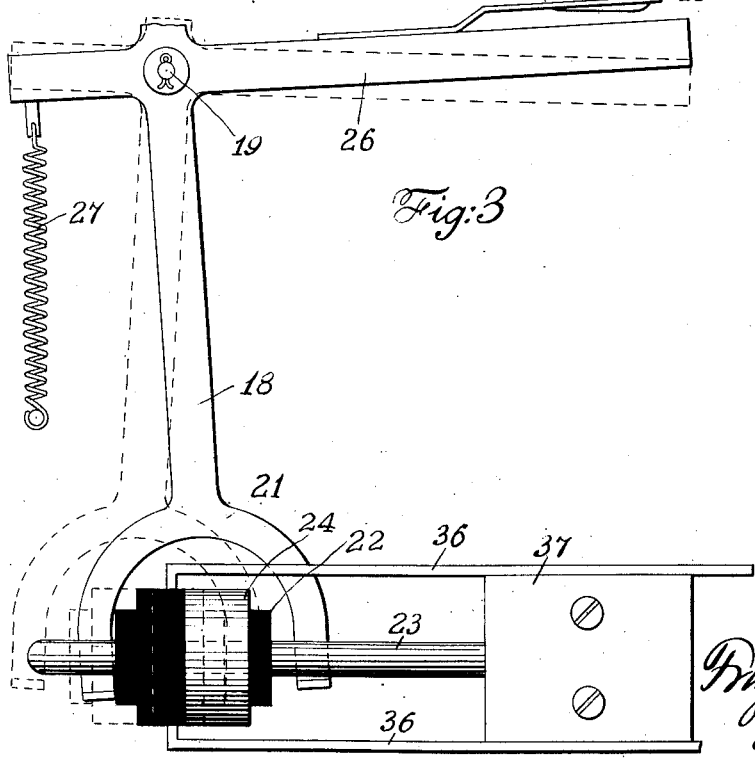
Fig. 3 is a fragmentary detail view, illustrating the contact action.

The operation of the device will be best understood in connection with the detail view shown in Fig. 3, wherein the extreme position of the armature in its released or unattracted position is shown in full lines; and the position when attracted by the electromagnets in dotted lines—the fork and contact member being shown in corresponding positions. As soon as current is introduced, the brushes 36 bearing on the insulation portion of the contact member, the magnets 25 will be energized to attract armature 26 and thus oscillate rod 18. In doing so, however, the right-hand tine of the fork of said rod will, after the lost motion has been taken up, engage the corresponding end of the contact member, which is held by friction between the contact brushes, and move same along the rod 23 until the brushes 36 slide upon the collar 24. This effects the short-circuiting of the electromagnets; and the amount of play is so adjusted that the short-circuiting will not occur until the armature 26 has been attracted substantially to its extreme inner position, thus affording the full effect of the magnetic force over substantially the entire stroke. When the magnets are thus rendered inactive at the end of this stroke, and the mechanism is in the position indicated by the dotted lines, retractile spring 27 and the energy stored in the pendulum 16 come into action to restore the various parts to the position shown in full lines. In doing so, however, the contact device is again re-engaged by the opposite tine of the fork 18 and moved along the rod 23 until the brushes reach the insulated portion of drum 22; whereupon, current is again directed to the electromagnets 25, and the armature 26 attracted and the cycle repeated. The adjustment of the lost motion is such, also, that this occurs substantially at the end of the return stroke.

I claim:

1. The combination with an oscillatable member forked at one end and provided with a slot at the opposite end, of an armature attached to said member to rock the same, an electromagnet to attract said armature, a lost motion contact device comprising a movable member, and contact brushes bearing thereon and controlling the current to said electromagnet, the fork of said oscillatable member being adapted to engage the said contact member, and a pendulum rod fitting in the other end of said oscillatable member.

2. The combination with an oscillatable member forked at one end and provided with a slot at the opposite end, of an armature attached to said member to rock the same, an electromagnet to attract said armature, a resistance included in circuit with said electromagnet, a rod substantially at right angles to said oscillatable member, an insulated cylinder movable thereon and carrying a contact ring, contact brushes bearing upon said cylinder to be connected by said contact ring and short-circuit the electromagnet, the tines of said oscillatable member surrounding said contact cylinder but allowing of play therebetween, and a pendulum rod fitting the slot of said oscillatable member.

Signed at New York in the county of New York and State of New York this 6th day of July, A. D. 1917.

FRITZ P. MANSBENDEL.